US012019468B2

United States Patent
Lin et al.

(10) Patent No.: US 12,019,468 B2
(45) Date of Patent: Jun. 25, 2024

(54) SCREEN FIXING APPARATUS

(71) Applicant: ASUSTEK COMPUTER INC., Taipei (TW)

(72) Inventors: Tsui-Wei Lin, Taipei (TW); Tsung-Ju Chiang, Taipei (TW); Chih-Wei Chuang, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 179 days.

(21) Appl. No.: 17/494,357

(22) Filed: Oct. 5, 2021

(65) Prior Publication Data

US 2022/0121238 A1 Apr. 21, 2022

(30) Foreign Application Priority Data

Oct. 15, 2020 (CN) .......................... 202011103116.X

(51) Int. Cl.
*G06F 1/16* (2006.01)
*F16M 11/04* (2006.01)

(52) U.S. Cl.
CPC ......... *G06F 1/1607* (2013.01); *F16M 11/041* (2013.01); *G06F 1/1601* (2013.01); *G06F 1/166* (2013.01)

(58) Field of Classification Search
CPC .... G06F 1/1601; G06F 1/1607; G06F 1/1632; G06F 1/166; G06F 1/1656; F16M 11/00; F16M 11/041; F16M 11/10; H05K 5/0234; H05K 5/0243; H05K 5/0217; F16B 5/0208; F16B 19/02
See application file for complete search history.

(56) References Cited

U.S. PATENT DOCUMENTS

| 6,256,075 | B1 * | 7/2001 | Yang | G06F 1/1601 |
| | | | | 348/836 |
| 7,317,613 | B2 * | 1/2008 | Quijano | F16M 11/2021 |
| | | | | 439/534 |
| 8,083,193 | B2 * | 12/2011 | Matsui | F16M 11/041 |
| | | | | 248/222.51 |
| 8,777,537 | B2 * | 7/2014 | Fritsch | F16B 43/00 |
| | | | | 411/338 |

(Continued)

FOREIGN PATENT DOCUMENTS

| CN | 204045139 U | 12/2014 |
| CN | 204062343 U | 12/2014 |

(Continued)

*Primary Examiner* — Adrian S Wilson
*Assistant Examiner* — Gage Crum
(74) *Attorney, Agent, or Firm* — MUNCY, GEISSLER, OLDS & LOWE, P.C.

(57) ABSTRACT

A screen fixing apparatus is provided, for fixing a screen on a support base. The screen fixing apparatus includes a plurality of fixing holes, a plurality of screw hole structures, a plurality of position limiting structures, and a buckling structure. The fixing holes is provided on a back plate of the screen. The screw hole structures is respectively disposed in the fixing holes. The position limiting structures is disposed on the support base, and correspond to the fixing holes. The buckling structure includes a plurality of fasteners, where the fasteners movably extend into the fixing holes, to buckle the position limiting structures to the corresponding fixing holes.

8 Claims, 6 Drawing Sheets

(56) References Cited

U.S. PATENT DOCUMENTS

| | | | | |
|---|---|---|---|---|
| 10,154,227 B2* | 12/2018 | Ikemoto | ............... | H05K 5/0204 |
| 10,185,360 B1* | 1/2019 | Yang | ..................... | G06F 1/1632 |
| 11,118,722 B2* | 9/2021 | Huang | ................. | F16M 11/041 |
| 11,396,970 B2* | 7/2022 | Huang | ................. | F16B 5/0628 |
| 2005/0050784 A1* | 3/2005 | Bang | ...................... | F16M 11/22 |
| | | | | 40/607.01 |
| 2006/0231667 A1* | 10/2006 | Tsuo | .................... | F16M 11/041 |
| | | | | 248/917 |
| 2007/0097617 A1* | 5/2007 | Searby | ................ | F16M 11/041 |
| | | | | 361/679.21 |
| 2008/0239643 A1* | 10/2008 | Min | ....................... | F16M 11/22 |
| | | | | 248/176.1 |
| 2010/0090569 A1* | 4/2010 | Huang | ................. | G06F 1/1601 |
| | | | | 345/87 |
| 2010/0219303 A1* | 9/2010 | Matsui | ................. | F16M 11/105 |
| | | | | 248/316.1 |
| 2012/0162570 A1* | 6/2012 | Lee | ...................... | G02F 1/1345 |
| | | | | 349/58 |
| 2012/0229009 A1* | 9/2012 | Fukumoto | .............. | F16M 13/02 |
| | | | | 312/293.3 |
| 2013/0093960 A1* | 4/2013 | Kita | ...................... | G06F 1/1601 |
| | | | | 361/679.01 |
| 2020/0174515 A1* | 6/2020 | So | .......................... | F16M 11/08 |
| 2021/0199233 A1* | 7/2021 | Jung | ..................... | F16M 11/04 |
| 2021/0255673 A1* | 8/2021 | Fan | ....................... | G06F 1/1656 |
| 2021/0317945 A1* | 10/2021 | Kim | ...................... | F16M 11/10 |
| 2021/0329802 A1* | 10/2021 | Kim | ................. | G02F 1/133314 |

FOREIGN PATENT DOCUMENTS

| | | |
|---|---|---|
| CN | 106155214 A | 11/2016 |
| CN | 106322058 A | 1/2017 |

\* cited by examiner

SCREEN FIXING APPARATUS

CROSS-REFERENCE TO RELATED APPLICATION

This application claims the priority benefit of Chinese Application Serial No. 202011103116.X, filed on Oct. 15, 2020. The entirety of the above-mentioned patent application is hereby incorporated by reference herein and made a part of the specification.

BACKGROUND OF THE INVENTION

Field of the Invention

The disclosure relates to a fixing apparatus, and in particular, to a screen fixing apparatus.

Description of the Related Art

Generally, a desktop display includes a screen and a stand member. A screen fixing apparatus is usually disposed at the joint of the screen and the stand member, to help a user assemble and disassemble.

However, a current screen fixing apparatus requires to dispose an additional fixing structure on an outer side of a back plate of a screen. The additional fixing structure affects the appearance of the screen.

BRIEF SUMMARY OF THE INVENTION

The disclosure provides a screen fixing apparatus

The screen fixing apparatus configures for fixing a screen on a support base. The screen fixing apparatus includes a plurality of fixing holes, a plurality of screw hole structures, a plurality of position limiting structures, and a buckling structure.

The plurality of fixing holes is provided on a back plate of the screen. The plurality of screw hole structures is disposed in the plurality of fixing holes correspondingly. The plurality of position limiting structures is disposed on the support base, and correspond to the fixing holes. The buckling structure includes a plurality of fasteners, where the fasteners movably extend into the fixing holes, to buckle the position limiting structures to the corresponding fixing holes.

A screen fixing apparatus provided in the disclosure integrates an existing screw hole structure on the back of a screen, achieves a quick assembly and disassembly without disposing an additional fixing structure on an outer side of a back plate of the screen, and avoids to impact the appearance of the screen.

DETAILED DESCRIPTION OF THE EMBODIMENTS

More detailed descriptions of the specific embodiments of the disclosure are provided below with reference to the accompanying drawings. The features and advantages of the disclosure are described more clearly according to the following description and claims. It is to be noted that all of the accompanying drawings use very simplified forms and imprecise proportions, which are only used for assisting in conveniently and clearly explaining the objective of the embodiments of the disclosure.

Figure 1:
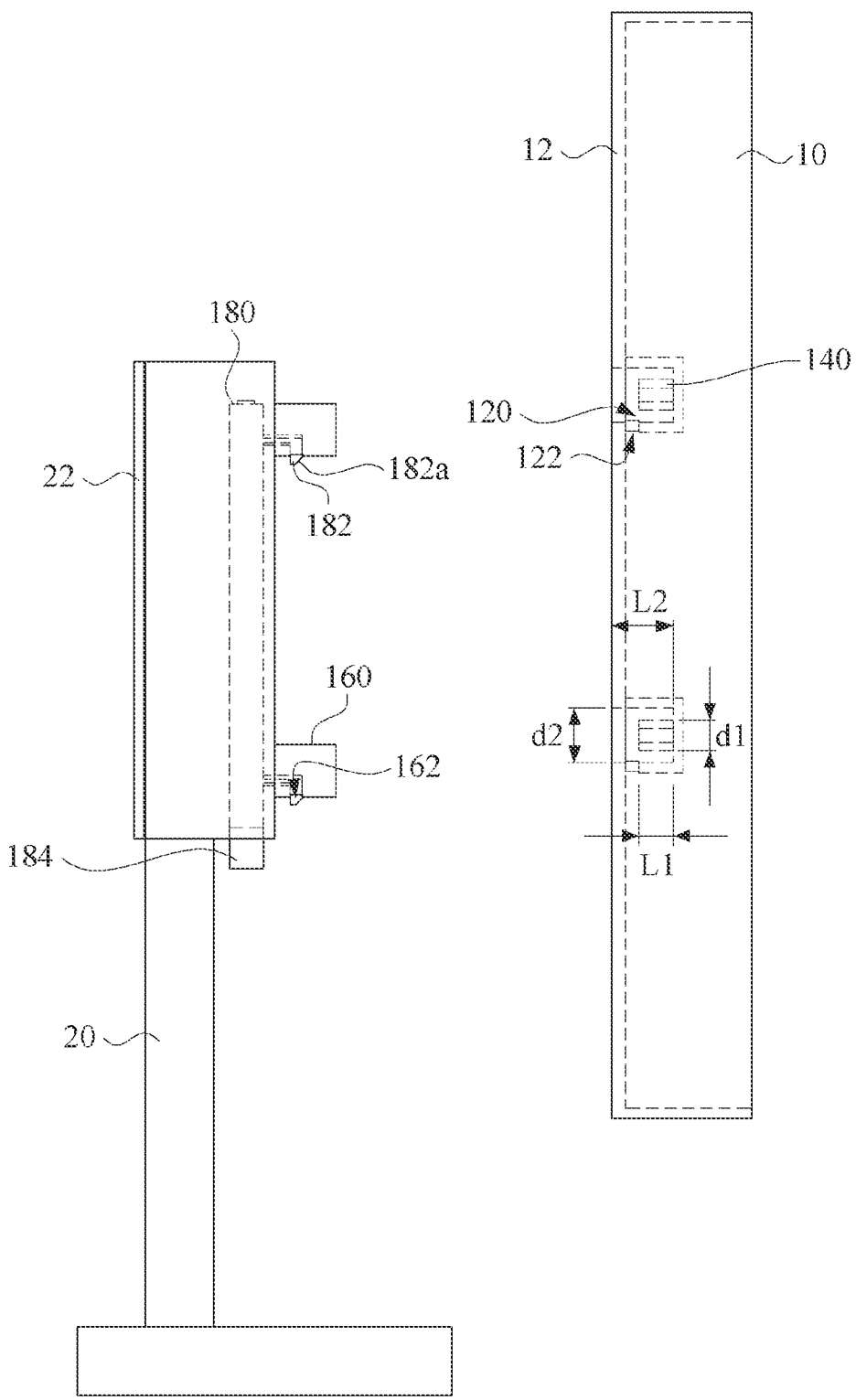
FIG. 1 is a schematic diagram of an embodiment of a screen fixing apparatus according to the disclosure.
Figure 2:
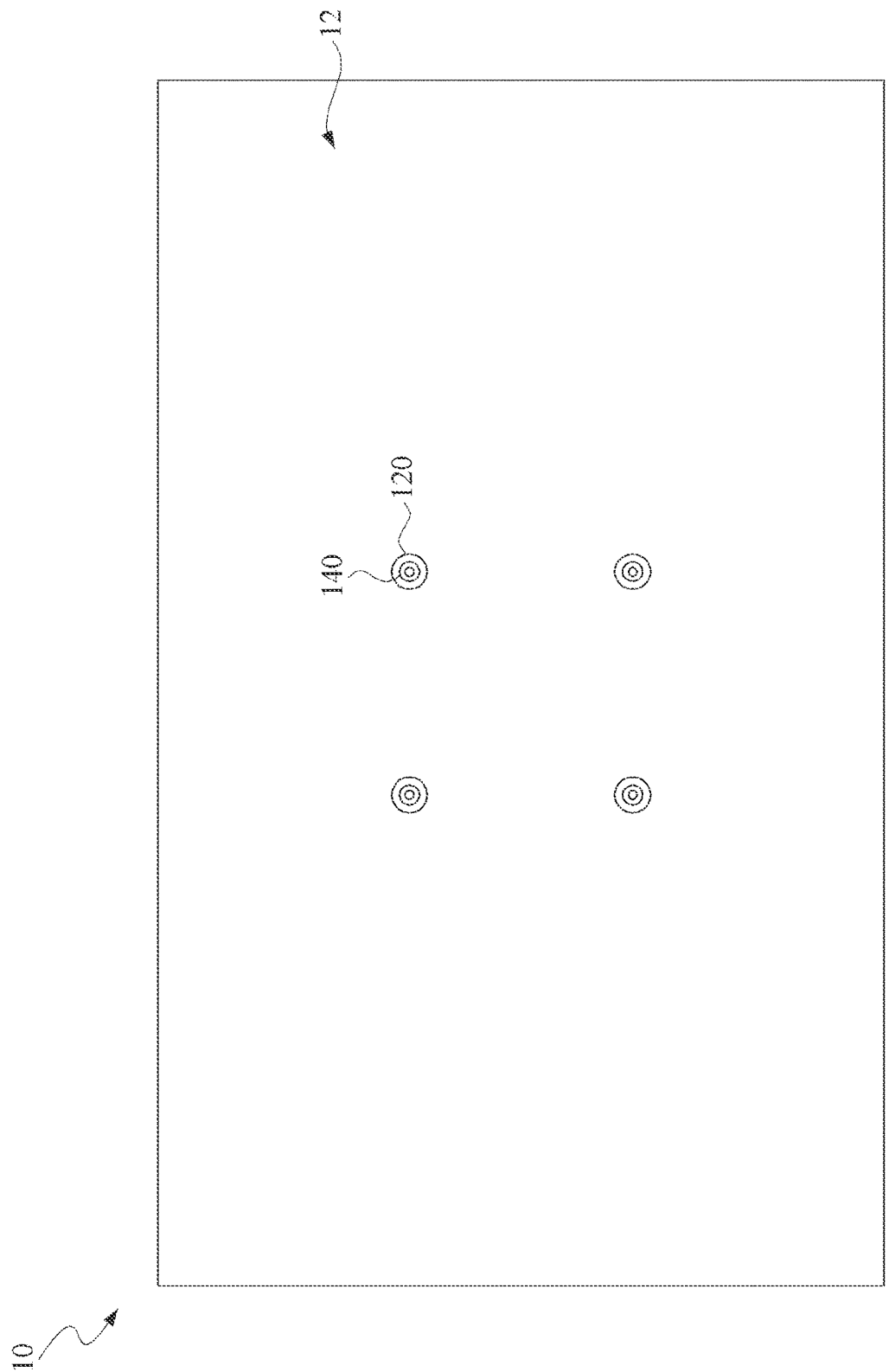
FIG. 2 is a schematic diagram of a back face of a screen in FIG. 1.
Figure 3:
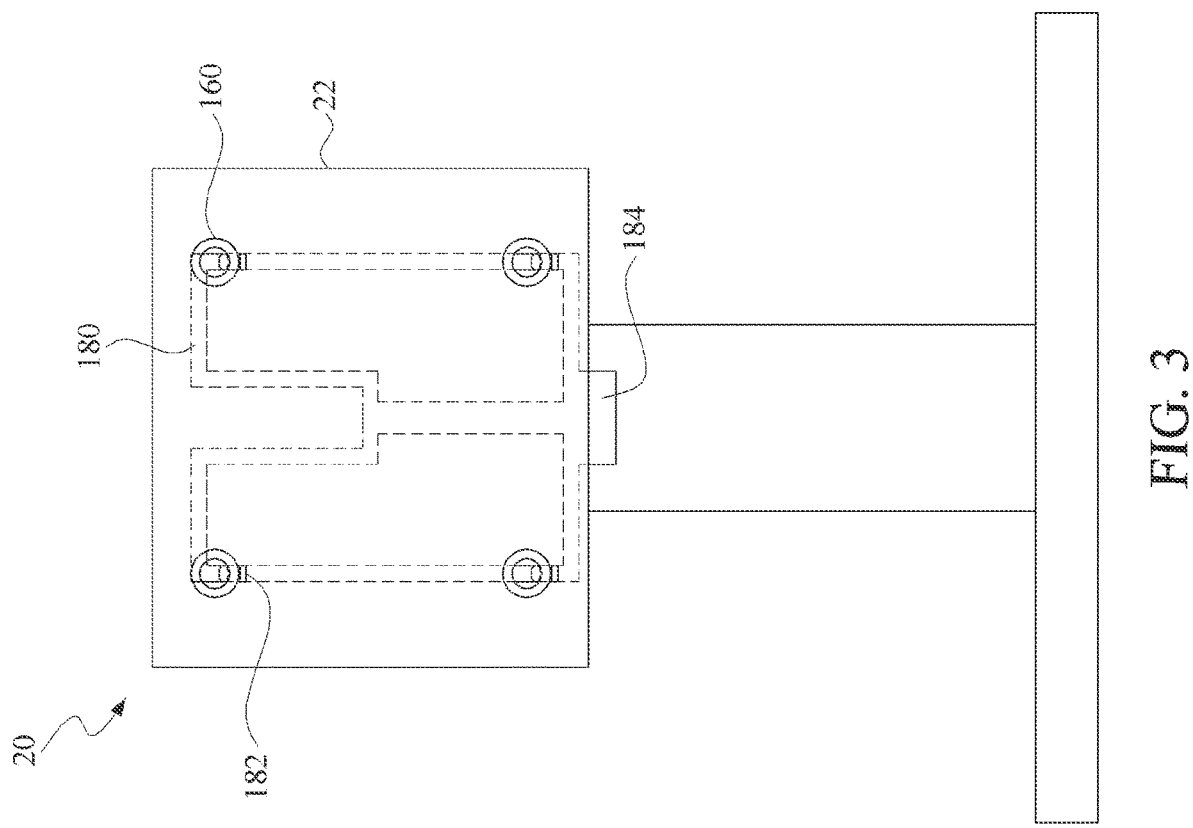
FIG. 3 is a schematic diagram of a front face of a stand member in FIG. 1.

Referring to FIG. 1 to FIG. 3, FIG. 1 is a schematic diagram of an embodiment of a screen fixing apparatus according to the disclosure, FIG. 2 is a schematic diagram of a back face of a screen in FIG. 1, and FIG. 3 is a schematic diagram of a front face of a stand member in FIG. 1.

As shown in the figures, a screen fixing apparatus 100 provided in this embodiment is used for fixing a screen 10 to a support base 22 of a stand member 20. The screen 10 is a liquid crystal display (LCD) screen, an organic light-emitting diode (OLED) display screen, or a micro-LED screen.

The screen fixing apparatus 100 includes a plurality of fixing holes 120, a plurality of screw hole structures 140, a plurality of position limiting structures 160, and a buckling structure 180. The fixing holes 120 and the screw hole structures 140 are disposed on a back plate 12 of the screen 10, and the screw hole structures 140 are disposed in the corresponding fixing holes 120.

The position limiting structures 160 are disposed on the support base 22. Positions of the position limiting structures 160 on the support base 22 correspond to positions of the fixing holes 120 on the back plate 12 of the screen 10. The buckling structure 180 is movably disposed on the support base 22 and includes a plurality of fasteners 182 for fixing the position limiting structures 160 into the fixing holes 120.

The screw hole structure 140 is located in the fixing hole 120 and extends from a bottom surface of the fixing hole 120 toward an opening of the fixing hole 120. In an embodiment, the screw hole structure 140 is located at a center of the fixing hole 120.

A diameter d1 of the screw hole structure 140 is less than an inner diameter d2 of the fixing hole 120, and a length L1 of the screw hole structure 140 is less than a depth L2 of the fixing hole 120, to ensure that the position limiting structure 160 smoothly extends into the fixing hole 120 for positioning and fixing. In an embodiment, the screw hole structure 140 is a tubular structure with internal threads.

In an embodiment, specifications of the screw hole structure 140 conform to a mounting standard about a flat display mounting interface (FDMI) in video electronics standards association (VESA) specifications. That is, the screw hole structures 140 are used for fixing the screen 10 to support bases conforming to the VESA specifications, and are not limited to the support base 22 provided in the disclosure.

The position limiting structures 160 are disposed on the support base 22. Positions of the position limiting structures 160 on the support base 22 correspond to positions of the fixing holes 120 on the back plate 12 of the screen 10. A shape of the position limiting structure 160 roughly corresponds to a shape of the fixing hole 120.

Referring to FIG. 2 and FIG. 3, in an embodiment, the fixing hole 120 is a circular hole, and the position limiting structure 160 is a cylinder to extend into the corresponding fixing hole 120 to position the screen 10 on the support base 22. In an embodiment, as shown in FIG. 4, the position limiting structure 160 is a circular tube structure, and an internal space of the circular tube structure is used to accommodate the screw hole structure 140 and the fastener 182.

In an embodiment, as shown in the figure, four screw hole structures 140 are provided, to conform to the VESA specifications. Four fixing holes 120 are provided on the back plate 12 of the screen 10 to correspond to the screw hole structures 140. Four position limiting structures 160 are disposed on the support base 22 to match the quantity of fixing holes 120. The quantity of position limiting structures 160 and the quantity of fixing holes 120 are adjusted according to requirements.

In an embodiment, the screen 10 is positioned on the support base 22 by two position limiting structures 160 and two fixing holes 120 of the screen fixing apparatus 100. The quantity of position limiting structures 160 and the fixing holes 120 is not limited.

Figure 4:
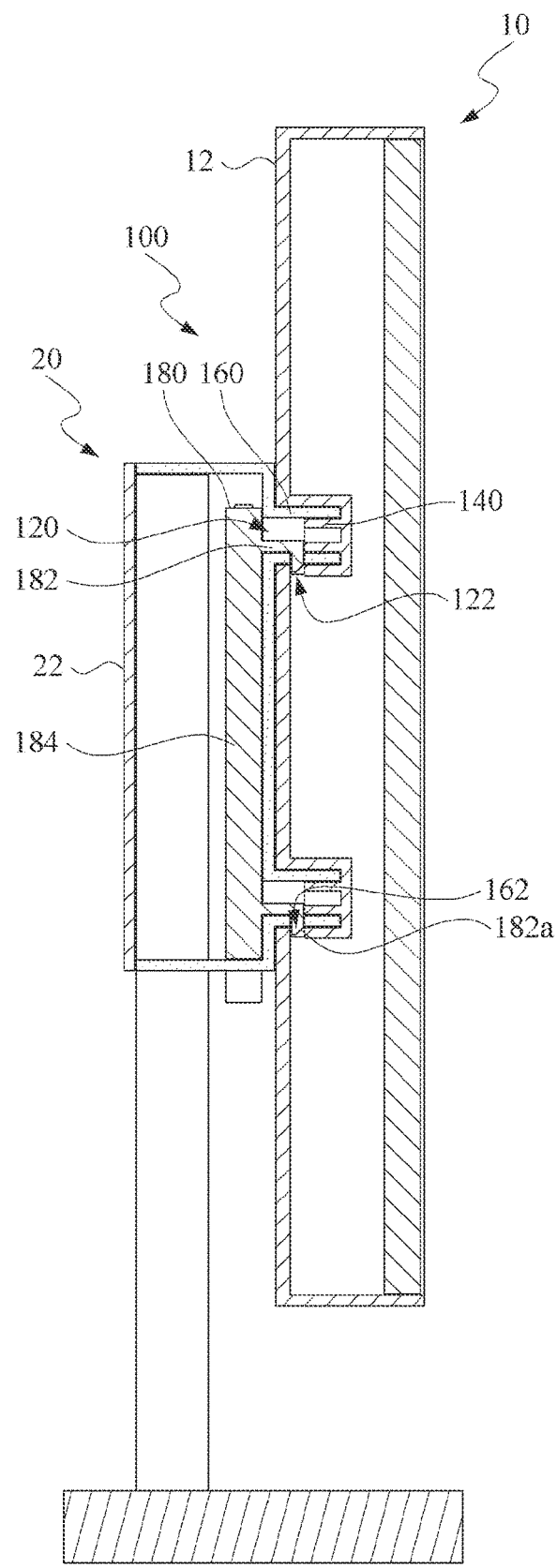
FIG. 4 is a schematic cross-sectional view of an embodiment in which a screen is fixed to a support base by a screen fixing apparatus according to the disclosure.

Referring to FIG. 4, each position limiting structure 160 includes a opening 162, and the opening 162 is located on a sidewall of the position limiting structure 160. Each fixing hole 120 includes a groove 122. The groove 122 is located on the sidewall of the fixing hole 120 and corresponds to the opening 162.

When the screen 10 is assembled to the support base 22, the fastener 182 extends from the opening 162 of the sidewall of the position limiting structure 160 into the groove 122 of the corresponding fixing hole 120. In this way, the fastener 182 buckles and fixes the position limiting structure 160 into the corresponding fixing hole 120, and fixes the screen 10 on the support base 22.

In an embodiment, as shown in the figure, the groove 122 is located at a lower side of the fixing hole 120, and the groove 122 opens upwards. The fastener 182 extends from top to bottom into the groove 122 for fixing. The opening 162 on the position limiting structure 160 is located on the lower side of the position limiting structure 160. According to requirements, the groove 122 is located on an upper side, a left side or a right side of the fixing hole 120, and the hole 162 is located on an upper side, a left side or a right side of the position limiting structure 160.

Besides, in an embodiment, referring to FIG. 4, the fastener 182 includes a slope 182a on a side facing the fixing hole 120. During assembling, the position limiting structure 160 extends into the fixing hole 120, and the slope 182a of the fastener 182 abuts against the fixing hole 120 and moves upward under the action of a force.

After the position limiting structure 160 fully extends into the fixing hole 120, the fastener 182 aligns with the groove 122 and returns to an original position to fix the position limiting structure 160 in the fixing hole 120. In an embodiment, an elastic element is disposed in the support base 22 to connect to the buckling structure 180, so as to provide an elastic restoring force required to push the fastener 182 into the groove 122 during the assembling.

In an embodiment, the buckling structure 180 is a tree-like structure and includes a press member 184. The press member 184 is connected to the fasteners 182 and moves together with the fasteners 182. The press member 184 extends to the outside of the support base 22 for a user to operate, to assemble and disassemble the screen 10.

Figure 5:
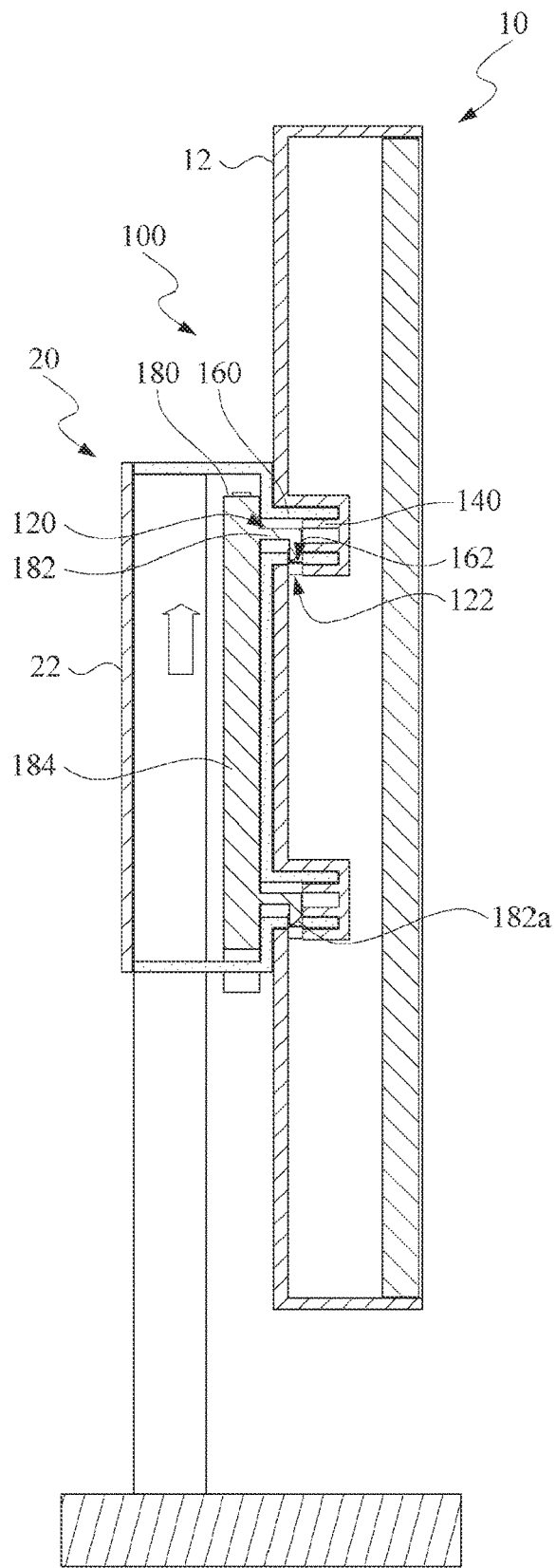
FIG. 5 is a schematic diagram of an embodiment in which a user operates a buckling structure to release a screen fixing apparatus.

Referring to FIG. 4 and FIG. 5 together, FIG. 5 is a schematic diagram of an embodiment in which a user operates a buckling structure 180 to release a screen fixing apparatus 100. As shown in the figure, by pushing the press member 184 of the buckling structure 180 upward, each of the fasteners 182 is moved upward simultaneously, so that each of the fasteners 182 is disengaged from the corresponding groove 122. That is, the screen 10 is detached from the support base 22.

Figure 6:
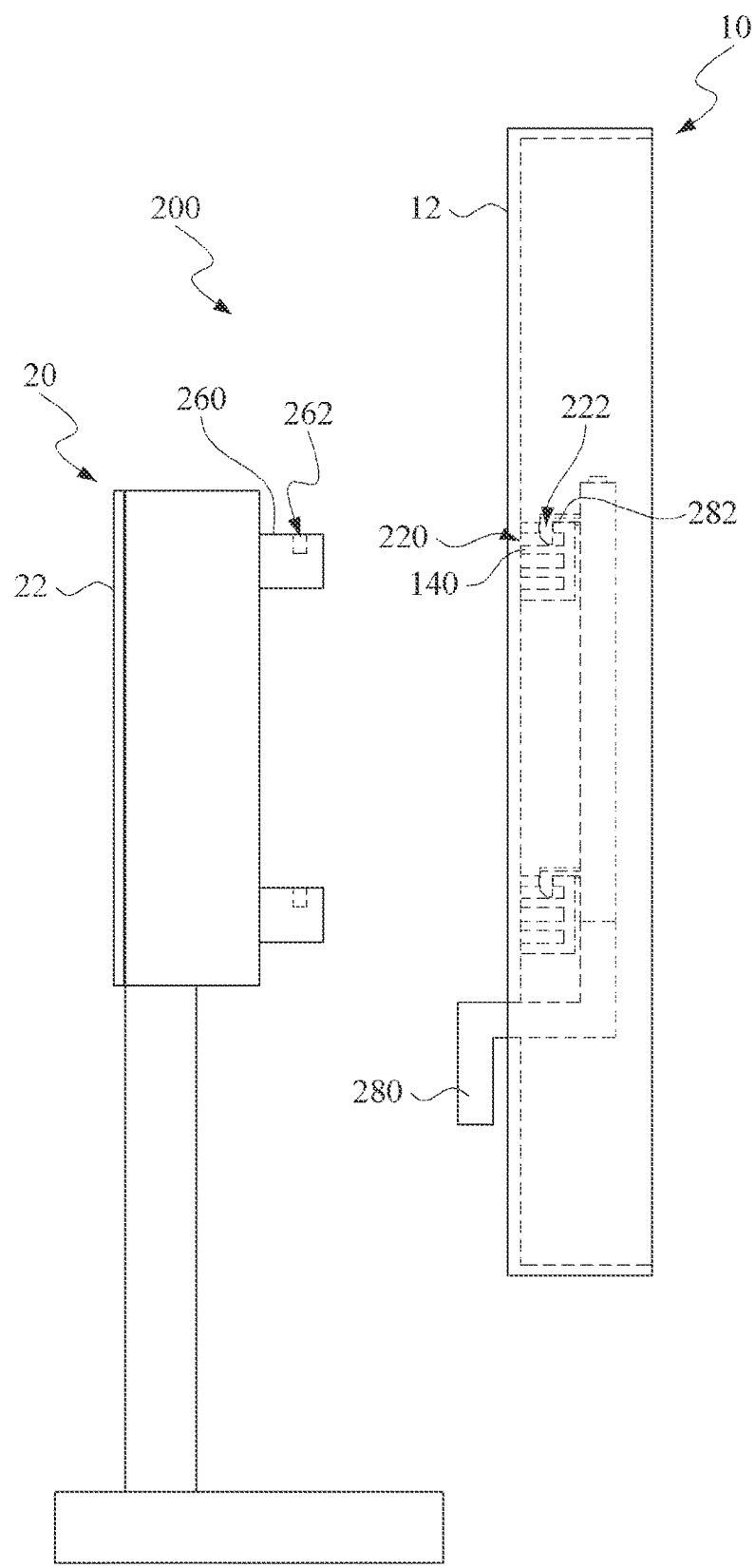
FIG. 6 is a schematic diagram of another embodiment of a screen fixing apparatus according to the disclosure.

FIG. 6 is a schematic diagram of another embodiment of a screen fixing apparatus 200 according to the disclosure. Different from the embodiment in FIG. 1 in which the buckling structure 180 is movably disposed on the support base 22, a buckling structure 280 of this embodiment is movably disposed on the screen 10.

In addition, to make fasteners 282 of the buckling structure 280 smoothly fix position limiting structures 260, a sidewall of each of fixing holes 220 includes a opening 222. The fastener 282 extends into the fixing hole 220 through the opening 222 to buckle the position limiting structure 260.

The position limiting structure 260 includes a groove 262 on a side corresponding to the fastener 282 to accommodate the fastener 282. The fastener 282 movably extends into the corresponding groove 262 through the opening 222. In this way, the fastener 282 buckles and fixes the position limiting structure 260 into the corresponding fixing hole 220, and fixes the screen 10 on the support base 22.

In an embodiment, as shown in the figure, the opening 222 is located on an upper side of the fixing hole 220. The fastener 282 extends from top to bottom through the opening 222 into the fixing hole 220. The groove 262 is located on an upper side of the fastener 282. According to requirements, the opening 222 is also located on a lower side, a left side or a right side of the fixing hole 220. Corresponding to a movable direction of the fastener 282, the groove 262 is located on a lower side, a left side or a right side of the position limiting structure 260.

The screen fixing apparatuses 100 and 200 provided in the disclosure integrate the existing screw hole structure 140 on the back of the screen 10, achieve an effect of quick assembly and disassembly without disposing an additional fixing structure on an outer side of a back plate of the screen 10, and avoid affecting the appearance of the screen.

Although the disclosure is described with reference to the above embodiments, the embodiments are not intended to limit the disclosure. A person skilled in the art may make variations and modifications without departing from the spirit and scope of the disclosure. Therefore, the protection scope of the disclosure is subject to the claims.

What is claimed is:

1. A screen fixing apparatus, applied to fix a screen on a support base, the screen fixing apparatus comprising:
   a plurality of fixing holes, provided on a back plate of the screen;
   a plurality of screw hole structures, respectively disposed in the fixing holes;
   a plurality of position limiting structures, disposed on the support base corresponding to the fixing holes; and
   a buckling structure, comprising a plurality of fasteners, wherein the fasteners movably extend into the fixing holes to have the position limiting structures fixed to the corresponding fixing holes,
   wherein the buckling structure is movably disposed on the support base, and
   wherein a sidewall of each of the fixing holes comprises an opening, and the fastener extends into the fixing hole through the opening to buckle the position limiting structure.

2. The screen fixing apparatus according to claim 1, wherein the opening is located on an upper side of the fixing hole.

3. The screen fixing apparatus according to claim 1, wherein the screw hole structure is located at a center of the fixing hole, and a length of the screw hole structure is less than a depth of the fixing hole.

4. The screen fixing apparatus according to claim 1, wherein the screw hole structure conforms to video electronics standards association (VESA) specifications.

5. A screen fixing apparatus, applied to fix a screen on a support base, the screen fixing apparatus comprising:
   a plurality of fixing holes, provided on a back plate of the screen;
   a plurality of screw hole structures, respectively disposed in the fixing holes;
   a plurality of position limiting structures, disposed on the support base corresponding to the fixing holes; and
   a buckling structure, comprising a plurality of fasteners, wherein the fasteners movably extend into the fixing holes to have the position limiting structures fixed to the corresponding fixing holes,
   wherein the buckling structure is movably disposed on the support base, and
   wherein each of the fixing holes comprises a groove, the groove is located on a sidewall of the fixing hole, and the fastener movably extends into the groove through a sidewall of the position limiting structure to buckle the fixing hole.

6. The screen fixing apparatus according to claim 5, wherein the groove opens upward.

7. The screen fixing apparatus according to claim 5, wherein the screw hole structure is located at a center of the fixing hole, and a length of the screw hole structure is less than a depth of the fixing hole.

8. The screen fixing apparatus according to claim 5, wherein the screw hole structure conforms to video electronics standards association (VESA) specifications.

\* \* \* \* \*